United States Patent [19]
Itagaki

[11] Patent Number: 5,816,770
[45] Date of Patent: Oct. 6, 1998

[54] TRANSFER ROBOT

[76] Inventor: Yasuhito Itagaki, 808, Sumiyoshijutaku 2, 2-30-31, Sumiyoshicho, Fuchu-shi, Tokyo, Japan

[21] Appl. No.: 787,174

[22] Filed: Jan. 23, 1997

[30] Foreign Application Priority Data

Jan. 23, 1996 [JP] Japan .................................... 8-009433

[51] Int. Cl.⁶ .................................................. B25J 18/00
[52] U.S. Cl. ...................... 414/744.5; 74/89.22; 74/399; 74/490.04; 901/21
[58] Field of Search ........................... 414/744, 4, 744.5; 901/21, 23, 24, 15; 74/399, 89.22, 89.21, 89.2, 10.7, 96, 490.04

[56] References Cited

U.S. PATENT DOCUMENTS 4,728,252  3/1988  Lada et al. ............................. 901/21 X
5,159,848  11/1992  Lawrence ............................... 74/399 X

*Primary Examiner*—Donald W. Underwood
*Attorney, Agent, or Firm*—Oblon, Spivak, McClelland, Maier & Neustadt, P.C.

[57] ABSTRACT

A transfer robot has a base, first and second intermediate arms, and a distal arm. First and second pulleys are fixed to driving and driven shafts of the first intermediate arm, respectively, and a flat belt is looped around the first and second pulleys. Each of the pulleys has an inner boss and an outer collar, and an eccentric ring is attached to the boss. In each of the pulleys, the flat belt surrounds a periphery of the collar, and is introduced into the collar through a side opening of the collar, and further surrounds a periphery of the eccentric ring. The tension of the flat belt is adjustable by adjusting the position of the eccentric ring relative to the boss in an angular direction.

10 Claims, 4 Drawing Sheets

TRANSFER ROBOT

BACKGROUND OF THE INVENTION

The present invention relates to a transfer robot, and particularly to a transfer robot suitable for handling a target object, such as a semiconductor wafer or an LCD substrate, in a clean atmosphere.

A transfer robot is used for transferring a target object, such as a semiconductor wafer or an LCD (Liquid Crystal Display) substrate, within, to or from a processing apparatus, such as a CVD (Clinical Vapor Deposition) apparatus, a diffusion apparatus, or resist applying apparatus. It is necessary for such a transfer robot to perform an accurate movement and to keep a clean atmosphere.

A representative transfer robot of this kind has an articulated arm structure formed of a combination of a distal arm for catching a target object, and at least one intermediate arm for connecting the distal arm to a base. A driving force from a driving motor arranged in the base is transmitted from a driving shaft to a driven shaft in the intermediate arm, and then transmitted to the distal arm. A timing belt is generally used for transmitting a driving force from the driving shaft to the driven shaft in the intermediate arm. Namely, timing pulleys are fixed to the driving and driven shafts, respectively, and the timing belt is looped around the pulleys. Further, in order to adjust the tension of the timing belt, at least on tension roller is arranged between the driving and driven shafts. The tension roller is adjustable over its position so as to change its contact pressure relative to a side surface of the timing belt.

Since the timing belt and the timing pulleys engages through their teeth, a backlash is inevitably caused therebetween. As a result, a slight vibration is generated due to interference among teeth when the teeth start or stop engaging with each other. A similar vibration due to a backlash is also caused between gears for transmitting a driving force from the driving motor to the driving shaft of the intermediate arm in the base. Since the articulated arm structure has a large length between the base to the distal arm, a vibration caused in the base or the intermediate arm is transmitted to a target object supported on the distal arm in an amplified state, even if the vibration is initially slight.

When the target object is vibrated on the distal arm, a positional shift of the target object is caused on the distal arm, and/or a fine powder is generated due to friction between the distal arm and the target object. The positional shift of the target object may cause trouble during its transfer, while the fine powder may decrease the yield of products. In order to solve these problems, a transfer robot is generally operated at a low speed so as to suppress generation of the vibration. This possible solution, however, results in a decrease in the throughput of a process.

A problem caused by the vibration of a target object becomes prominent, in an atmosphere of a reduced pressure, i.e., a so-called vacuum atmosphere, in which a vacuum chuck cannot be used for fixing the target object to the distal arm. For example, transfer of the target object is performed in a vacuum atmosphere between a process chamber and a load lock chamber arranged before the process chamber. When a fine powder is generated in the process chamber or the load lock chamber, the atmosphere in the process chamber is directly contaminated.

There is another problem in relation to tension adjustment of the timing belt in the intermediate arm. The timing belt is expanded with the lapse of time, and thus has to be periodically adjusted over its tension. Since the adjustment mechanism of the tension is arranged between the driving and driven shafts, as described above, it is necessary to open a top lid, which should cover the driving and driven shafts all over, so as to ensure a sufficient operation space. In this case, a magnetic fluid seal, arranged at a portion through which the driven shaft penetrates the top lid, is broken. As a result, the adjusting operation requires an additional cost of no use as well as troublesomeness.

BRIEF SUMMARY OF THE INVENTION

The present invention has been made in consideration of the above described problems, and has an object, to provide a transfer robot which moves smoothly without vibration, and enables an easy tension adjustment of the driving belt.

According to a first aspect of the present invention, there is provided a transfer robot comprising:
a first arm connected to a driving shaft which receives a driving force from a driving source;
a second arm connected to the first arm by a driven shaft which receives a driving force from the driving shaft;
a supporting portion connected to the second arm, for supporting a target object;
first and second pulleys attached to the driving and driven shafts, respectively, the first pulley having an inner boss fixed to the driving shaft, and an outer collar surrounding the boss with a distance therebetween and having a side opening;
an eccentric ring fixed to the boss within the collar, such that the eccentric ring is adjustable over its position relative to the boss in an angular direction; and
a flat belt looped around the first and second pulleys, such that the flat belt surrounds a periphery of the collar, and is introduced into the collar through the side opening, and further surrounds a periphery of the eccentric ring within the collar,
wherein the flat belt is adjustable over its tension by adjusting the eccentric ring over its position relative to the boss in an angular direction.

According to a second aspect of the present invention, there is provided a transfer robot comprising:
a driving motor;
a driving shaft which receives a driving force from the driving motor;
an arm which is swung by rotation of the driving shaft;
a supporting portion connected to the arm, for supporting a target object;
a first gear attached to an output shaft of the driving motor;
a second gear engaging with the first gear and connected to the driving shaft, for transmitting a driving force from the driving motor to the driving shaft;
a supporting arm supporting the driving motor and movable along with the driving motor and the first gear toward and away from the second gear; and
a spring providing the supporting arm with a bias force for pushing the first gear against the second gear,
wherein the bias force given by the spring prevents backlash from being caused between the first and second gears.

DETAILED DESCRIPTION OF THE INVENTION

Figure 1:
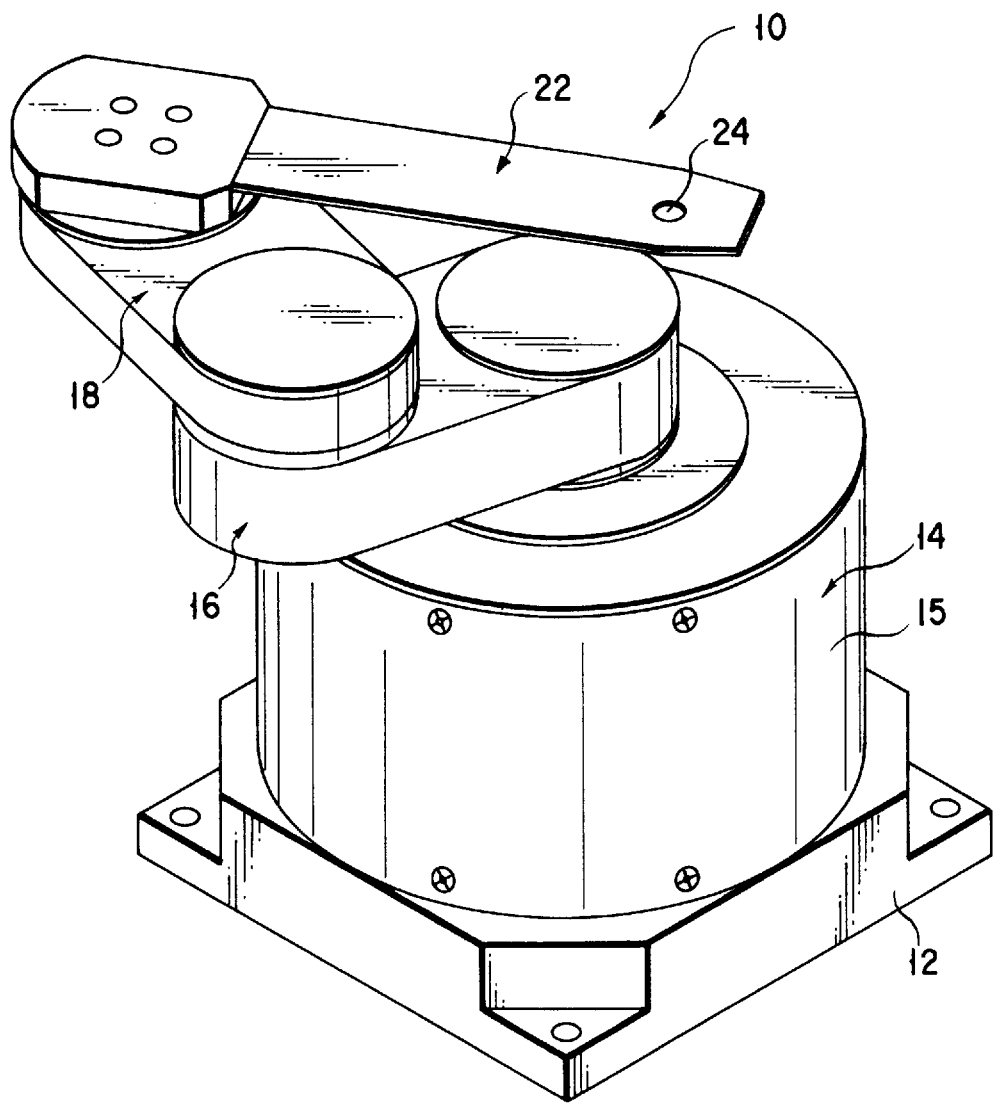
FIG. 1 is a perspective view showing a transfer robot for a semiconductor wafer, according to an embodiment of the present invention.

FIG. 1 is a perspective view showing a transfer robot 10 for a semiconductor wafer, according to an embodiment of the present invention.

The transfer robot 10 has a base 14 with a mount flange 12, while first and second intermediate arms 16 and 18, and a distal arm 22 are connected to the base 14 in this order. The base 14 and arms 16, 18, and 22 are rotatably connected to each other, so that an articulated arm structure is constituted. An end portion of the distal arm 22 is provided with an opening of a vacuum chuck for fixing a wafer onto the distal arm 22 by means of vacuum attraction force.

Figure 2:
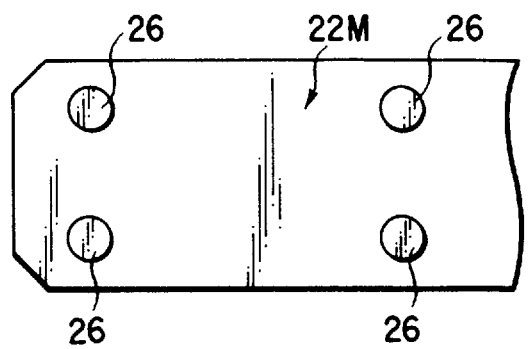
FIG. 2 is a plan view showing a modification of a distal arm.

The distal arm 22 may be modified to a distal arm 22M shown in FIG. 2. In FIG. 2, the distal arm 22M has a width larger than that of the distal arm 22 shown in FIG. 1, and is provided with a plurality of, e.g., four, support pads 26 thereon. A wafer is supported by the distal arm 22M such that it is mounted on the support pads 26. This modification is used in a case where no vacuum chuck can be used, e.g., in a vacuum atmosphere. In this case, since the wafer is not fixed to the distal arm 22M, vibration of the wafer during its transfer cause serious problems.

Figure 3:
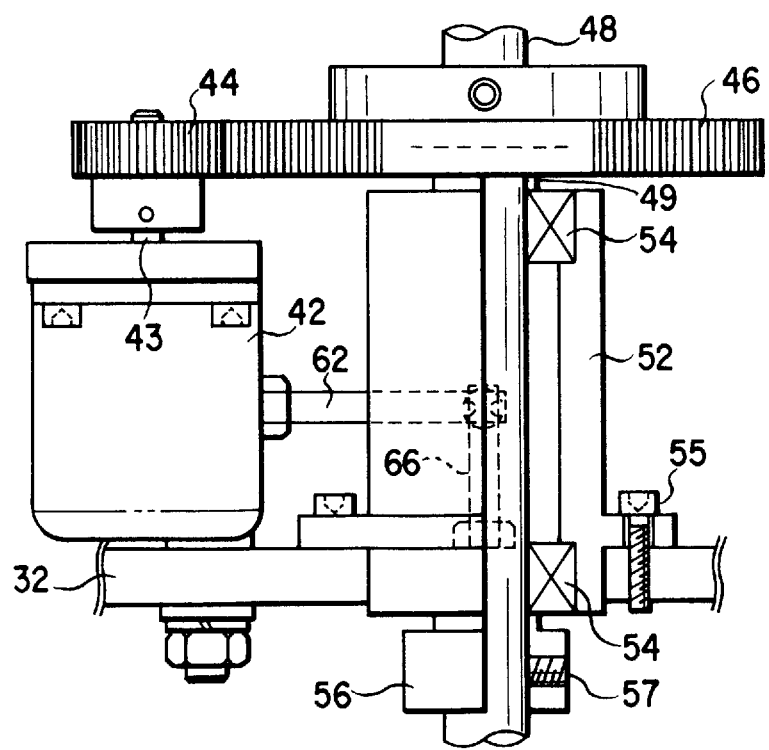
FIG. 3 is a partially cross sectional front view showing a driving mechanism arranged in the base of the transfer robot shown in FIG. 1.
Figure 4:
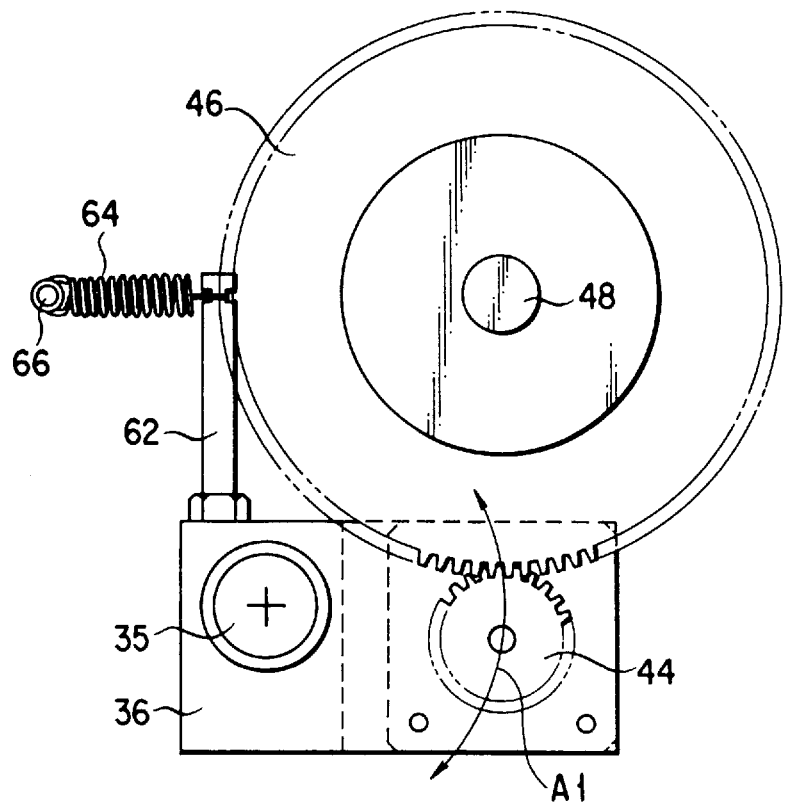
FIG. 4 is a plan view showing the driving mechanism shown in FIG. 3.
Figure 5:
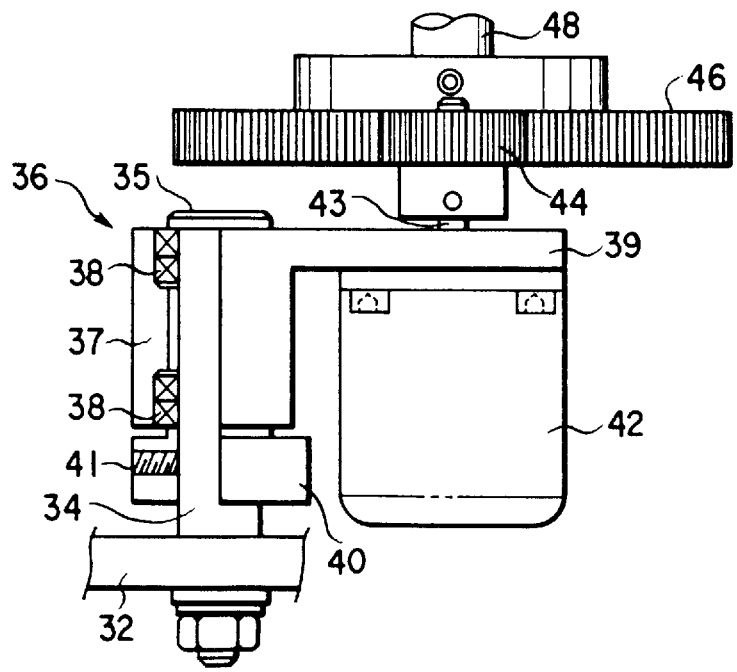
FIG. 5 is a partially cross sectional side view showing the driving mechanism shown in FIG. 3.

FIG. 3 is a partially cross sectional front view showing a driving mechanism arranged in the base 14, and FIGS. 4 an 5 are a plan view and a partially cross sectional side view showing the driving mechanism.

A base plate 32 for supporting the driving mechanism is fixed horizontal in a casing 15 of the base 14. A shaft 34 is fixed vertical to the base plate 32, and a swing arm 36 for supporting a bidirectional motor 42 is pivotally mounted on the shaft 34. The swing arm 36 has a boss 37 attached to the shaft 34 and an arm plate 39 extending horizontal from the upper part of the boss 37.

Bearings 38 are arranged in the boss 37 at its top and bottom positions to correspond to the shaft 34. The shaft 34 is provide with a flange 35 at its top and in contact with the top surface of the upper bearing 38. The shaft 34 is also provide with a stopper ring 40 in contact with the bottom surface of the lower bearing 38. Accordingly, the upper and lower bearings 38 engage with the flange 35 and the stopper ring 40, so that they function as radial and thrust bearings for the swing arm 36, and prevent a positional shift of the swing arm 36 in the vertical direction. The stopper ring 40 is detachably fixed to the shaft 34 by an embedded screw 41.

The bidirectional motor 42 is mounted on a bottom surface of the arm plate 39 of the swing arm 36, such that its output shaft 43 is directed vertically upward. A pinion 44 is fixed to the output shaft 43 and engages with a large diameter gear 46. The large diameter gear 46 has a shaft 48 on its rotational axis directed vertical, and the lower part of the shaft 48 is rotatably held by a cylinder 52. The cylinder 52 is fitted into an opening formed in the base plate 32, and detachably fixed to the base plate 32 by a screw 55.

The cylinder 52 contains bearings 54 at its upper and lower positions to correspond to the shaft 48. The shaft 48 is provided with a spacer 49 in contact with the top surface of the upper bearing 54. The shaft 48 is also provided with a stopper ring 56 in contact with the bottom surface of the lower bearing 54 behind the base plate 32. Accordingly, the upper and lower bearings 54 engage with the spacer 49 and the stopper ring 56, so that they function as radial and thrust bearings for the shaft 48, and prevent a positional shift of the shaft 48 in the vertical direction. The stopper ring 56 is detachably fixed to the shaft 48 by an embedded screw 57.

A spring hook 62 of a rod-like shape is horizontally fixed to one side of the boss 37 of the swing arm 36. On the other hand, a spring hook 66 of a rod-like shape is vertically fixed to the base plate 32. The tips of the spring hooks 62 and 66 face each other, and an extension spring 64 is suspended therebetween. With the spring 64, a swinging force indicated with an arrow A1 in FIG. 4 is given to the swing arm 36. In other words, the pinion 44 is biased to the large diameter gear 46, thereby preventing backlash between the pinion 44 and the large diameter gear 46 from being caused. Note that, although an extension spring is used as the spring 64 in this embodiment, a compressing spring can be used instead, by changing the position of the spring hook 62.

The upper part of the shaft 48 functioning as the rotational axis of the large diameter gear 46 penetrates the top plate of the casing 15 of the base 14 and is connected to the first intermediate arm 16. A driving force on the shaft 48 is transmitted from the first and second intermediate arms 16 and 18 to the distal arm 22. The first and second intermediate arms 16 and 18 have essentially the same structure. For this reason, only the first intermediate arm 16 is explained below as an example.

Figure 6:
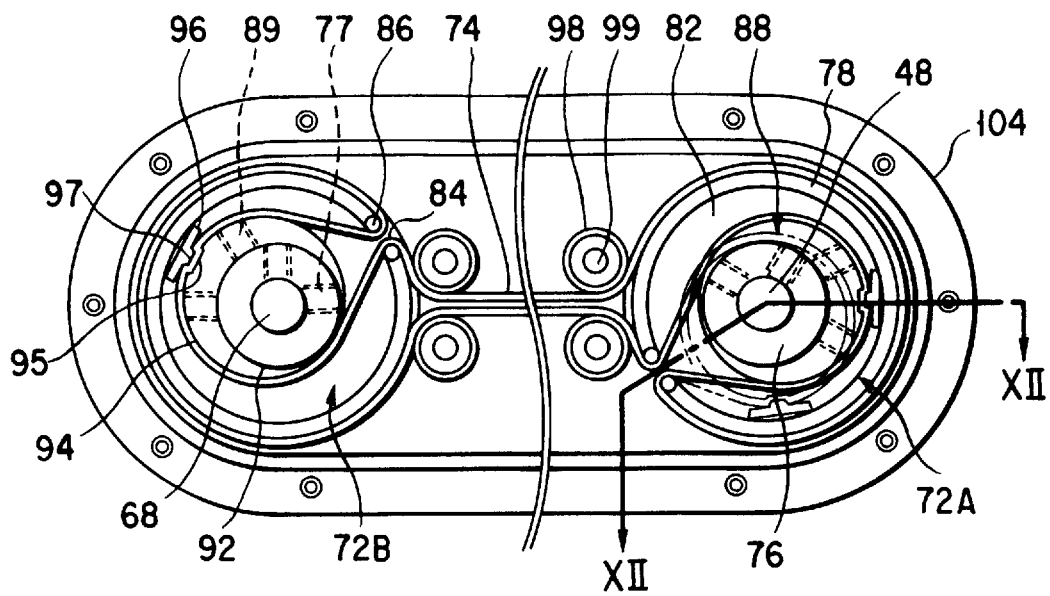
FIG. 6 is a cross sectional view along line XI—XI of FIG. 7, showing the inside of the first intermediate arm of the transfer robot shown in FIG. 1.
Figure 7:
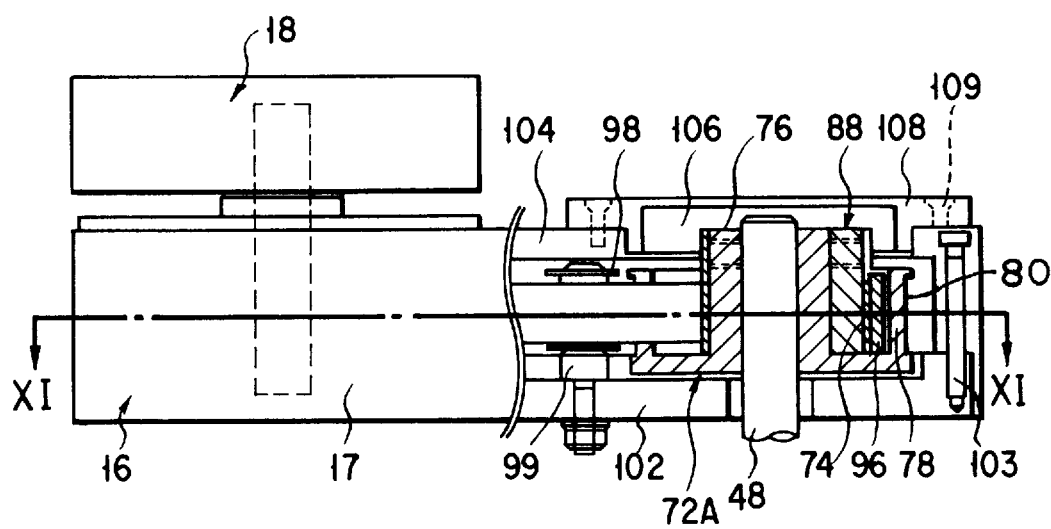
FIG. 7 is a side view including a cross sectional view along line XII—XII of FIG. 6, and showing the first and second intermediate arms of the transfer robot shown in FIG. 1.

FIG. 6 is a cross sectional view along line XI—XI of FIG. 7, showing the inside of the first intermediate arm 16, and FIG. 7 is a side view including a cross sectional view along line XII—XII of FIG. 6, and showing the first and second intermediate arms 16 and 18.

In the first intermediate arm 16, the shaft 48 works as a driving shaft while a vertical shaft 68 connecting the first and second arms 16 and 18 works as a driven shaft. The shafts 48 and 68 are provided with first and second pulleys 72A and 72B, respectively, and a flat belt 74 is looped around the pulleys.

In this embodiment, the first and second pulleys 72A and 72B have essentially the same structure. For this reason, the first and second pulleys 72A and 72B are explained below in common while common reference numbers are given to their members.

Each of the pulleys 72A and 72B has a boss 76 and a collar 78 located on the inner and outer sides, respectively, and formed coaxial and integrated. A circular space 82 is formed between the boss 76 and the collar 78. Each of the pulleys 72A and 72B are detachably fixed to the shaft 48 or 68 by embedded screws 77 arranged in the boss 76. A shallow groove 80 having a flat bottom is formed around the outer face of the collar 78 to correspond to the shape of the flat belt 74. Further, a slit or side opening 84 is formed in the collar 78, for introducing the flat belt 74 into the circular space 82. The side opening 84 is provided with pins 86 on both its sides or on the opposite ends of the collar 78, for guiding the flat belt 74.

An eccentric ring 88 is fitted onto the boss 76 to leave a sufficient space in the circular space 82. The eccentric ring 88 has a smooth outer surface 94 which is eccentric relative to a fitting through hole 92 for inserting the boss 76. The eccentric ring 88 is fixed to the boss 76 by embedded screws 89 such that the ring 88 is adjustable over its position relative to the boss 76 in an angular direction.

The flat belt 74 is looped around the outer surface of the collar 78 arranged in each of the first and second pulleys 72A and 72B, and introduced into the circular space 82 through the side opening 84, and further looped around the outer surface of the eccentric ring 88. In the circular space 82, the flat belt 74 is fixed and connected to each of the first and second pulleys 72A and 72B and the eccentric ring 88 by a belt-fixing member 96. More specifically, the thickest portion of the eccentric ring 88 is provided with a groove 95 on its side, while the belt-fixing member 96 is provided with a projection 97. When the belt-fixing member 96 is inserted into the circular space 82 such that the flat belt 74 is pinched between the groove 95 and the projection 97, both the sides of the belt-fixing member 96 abut the inner surface of the collar 78, thereby fixing the flat belt 74.

Two pairs of belt-guiding rollers 98 are arranged close to the first and second pulleys 72A and 72B, respectively. Each of the guiding rollers 98 is rotatably mounted on a vertical pin 99 fixed to a bottom plate 102 of the casing 17 of the first intermediate arm 16. Each of the guiding rollers 98 is separated from the outer surface of the collar 78 by a distance corresponding approximately to the thickness of the flat belt 74. Each pair of the guiding rollers 98 are arranged symmetrical relative to a line connecting the centers of the driving and driven shafts 48 and 68, such that they are separated from each other by a distance slightly larger than the width of the slit or side opening 84. Accordingly, between the first and second pulleys 72A and 72B, the flat belt 74 is guided along the line connecting the centers of the shafts 48 and 68 while it is squeezed.

The casing 17 of the first intermediate arm 16 has a cover 104 fixed to the bottom plate 102 by screws 103. An opening 106 is formed on the top of the cover 104 so as to correspond only to the first pulley 72A. The opening 106 is closed by a top lid 108 which is detachably fixed to the cover 104 by screws 109.

When the transfer robot 10 having the above described constitution is assembled at first, the flat belt 74 is adjusted over its tension in a state where the cover 104 is detached from the bottom plate 102. The flat belt 74 is put through the pairs of the guiding rollers 98 and looped around the collars 78 and eccentric rings 88 of the first and second pulleys 72A and 72B, while the eccentric rings 88 are not being fixed to the bosses 76. Then, the eccentric rings 88 of the first and second pulleys 72A and 72B are rotated so as to set the tension of the flat belt 74 at a predetermined degree, and the rings 88 are fixed to the respective bosses 76. Further, the belt-fixing members 96 are inserted into the respective circular spaces 82 so that the flat belt 74 is connected and fixed to the first and second pulleys 72A and 72B, and the eccentric rings 88.

After the transfer robot 10 is assembled, the flat belt 74 is adjusted over its tension while only the top lid 108 of the cover 104 is being opened. In this case, at first, the belt-fixing member 96 in the first pulley 72A is taken out so as to set the flat belt 74 free from the first pulley 72A. Then, the embedded screws 89 are unfastened to release the fixing of the eccentric ring 88, and the eccentric ring 88 is rotated so that the tension of the flat belt 74 is adjusted. After the adjustment, the eccentric ring 88 is fixed to the boss 76, and the belt-fixing member 96 is inserted in the circular space 82, so that the flat belt 74 is connected and fixed to the first pulley 72A and the eccentric ring 88. In this operation, a magnetic fluid seal, arranged at a portion through which the driven shaft 68 penetrates the cover 104 is not broken, so that it is possible to decrease troublesomeness and cost necessary for the adjusting operation.

In the transfer robot 10 having the above described constitution, the flat belt 74 is used in place of a timing belt, and further the pinion 44 of the driving motor 42 is biased to the large diameter gear 46 by the spring 64, thereby suppressing backlash to be caused among gears. As a result, the transfer robot 10 can smoothly move without any vibration even in a high speed mode. It follows that fine powders due to the vibration is prevented from being generated, so that the throughput of a process can be improved as well as the yield of products.

A performance comparative test was conducted between the transfer robot 10 according to this embodiment and a conventional transfer robot having corresponding functions. As a result, it was confirmed that vibration of the transfer robot 10 was smaller than that of the conventional transfer robot, even when the transfer robot 10 was moved three times faster than the conventional one.

Furthermore, since the tension adjustment mechanism for the flat belt 74 is arranged within the first and second pulleys 72A and 72B, the intermediate arms can be slimly formed, and the rotational angle range of each pulley can be wide. The rotational angle range of each pulley means the operable angle range of the transfer robot, and thus is one of the important conditions in such kind of transfer robots.

Note that, although the first and second pulleys 72A and 72B have essentially the same structure in the above described embodiment, it is sufficient for obtaining the advantages of the present invention to provide at least the first pulley 72A connected to the driving shaft 48 with the mechanism for adjusting the belt tension.

Further, although a semiconductor wafer is shown as a target substrate in the above described embodiment, the transfer robot 10 can be applied to handling for various kinds of substrates, such as an LCD substrate, a CD disk, and a floppy disk, by modifying the shape of the distal arm 22.

According to the present invention, it is possible to provide a transfer robot which moves smoothly without vibration, and enables an easy tension adjustment of a driving belt.

I claim:

1. A transfer robot comprising:
   a first arm connected to a driving shaft which receives a driving force from a driving source;
   a second arm connected to said first arm by a driving shaft which receives a driving force from said driving shaft;
   a supporting portion connected to said second arm, for supporting a target object;
   first and second pulleys attached to said driving and driven shafts, respectively, said first pulley having an inner boss fixed to said driving shaft, and an outer collar surrounding said boss with a distance therebetween and having a side opening;
   an eccentric ring fixed to said boss within said collar by adjustable means, such that said eccentric ring is adjustable over its position relative to said boss in an angular direction; and
   a flat belt looped around said first and second pulleys, such that said flat belt surrounds a periphery of said collar, and is introduced into said collar through said side opening, and further surrounds a periphery of said eccentric ring within said collar, wherein said flat belt is adjustable over its tension by adjusting said eccentric ring over its position relative to said boss in an angular direction.

2. The transfer robot according to claim 1, further comprising a belt-fixing member detachably inserted between said boss and said collar so as to push said flat belt against said eccentric ring.

3. The transfer robot according to claim 2, wherein said boss is provided with a groove formed thereon and said belt-fixing member pushes said flat belt into said groove.

4. The transfer robot according to claim 1, wherein said side opening is provide with pins at its edge, for guiding said flat belt.

5. The transfer robot according to claim 1, further comprising a pair of guiding rollers arranged between said driving and driven shafts and adjacent to the periphery of said collar, said pair of guiding rollers is separated from each other by a distance smaller than a diameter of said collar.

6. The transfer robot according to claim 1, further comprising:

a first gear attached to an output shaft of a driving motor included in said driving source;

a second gear engaging with said first gear and connected to said driving shaft, for transmitting a driving force from said driving motor to said driving shaft;

a supporting arm supporting said driving motor and movable along with said driving motor and said first gear toward and away from said second gear; and a spring providing said supporting arm with a bias force for pushing said first gear against said second gear, wherein said bias force given by said spring prevents backlash from being caused between said first and second gears.

7. The transfer robot according to claim 6, wherein said supporting arm is swingable toward and away from said second gear.

8. The transfer robot according to claim 6, wherein said second gear is fixed coaxially to said driving shaft.

9. The transfer robot according to claim 6, wherein said spring is an extension spring.

10. The transfer robot according to claim 6, wherein said supporting portion is provided with a plurality of supporting pads on which said target object is mounted.

* * * * *